No. 870,440. PATENTED NOV. 5, 1907.
B. A. KARR.
HORIZONTAL ROLLER COASTER.
APPLICATION FILED AUG. 12, 1907.

3 SHEETS—SHEET 1.

Inventor
Burton A. Karr.

Witnesses:
Roy G. Kratz
H. J. Cathroe

By David O. Barnell
Attorney.

No. 870,440. PATENTED NOV. 5, 1907.
B. A. KARR.
HORIZONTAL ROLLER COASTER.
APPLICATION FILED AUG. 12, 1907.

3 SHEETS—SHEET 2.

Burton A. Karr, Inventor

Witnesses:
Roy G. Kratz
H. J. Cathroe

By David O. Barnell
Attorney.

No. 870,440. PATENTED NOV. 5, 1907.
B. A. KARR.
HORIZONTAL ROLLER COASTER.
APPLICATION FILED AUG. 12, 1907.
3 SHEETS—SHEET 3.
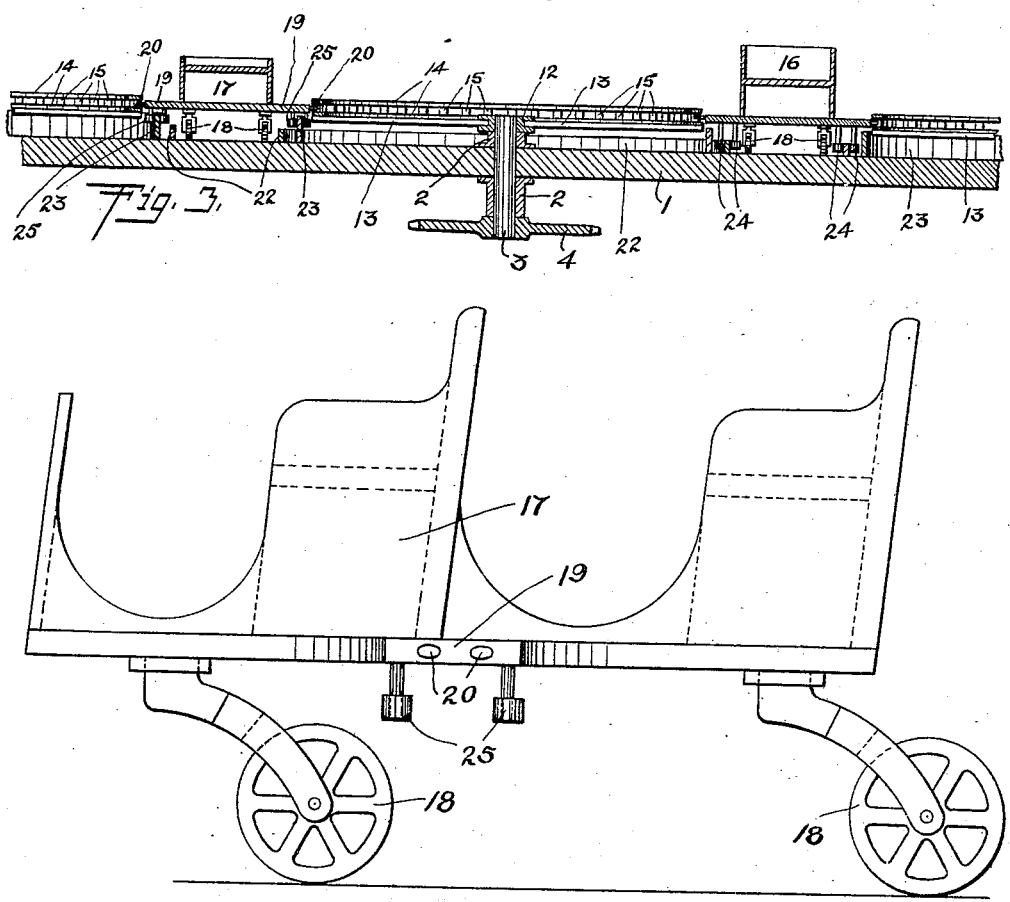
Burton A. Karr, Inventor.
Witnesses:
Roy G. Kratz
H. J. Cathro
By David O. Barnell,
Attorney.

UNITED STATES PATENT OFFICE.

BURTON A. KARR, OF OMAHA, NEBRASKA, ASSIGNOR, BY MESNE ASSIGNMENTS, TO UNIVERSAL AMUSEMENT COMPANY, A CORPORATION OF OKLAHOMA TERRITORY.

HORIZONTAL ROLLER-COASTER.

No. 870,440.   Specification of Letters Patent.   Patented Nov. 5, 1907.

Application filed August 12, 1907. Serial No. 388,271.

*To all whom it may concern:*

Be it known that I, BURTON A. KARR, a citizen of the United States, and a resident of Omaha, in the county of Douglas and State of Nebraska, have invented certain new and useful Improvements in Horizontal Roller-Coasters, of which the following is a specification.

My invention relates to pleasure-railways of the roller-coaster type, and it is the object thereof to provide a pleasure-railway in which cars are driven in a horizontal plane around intersecting endless pathways made up of alternating curvilinear sections, and to provide simple and substantial means for actuating and guiding the cars.

Figure 1:
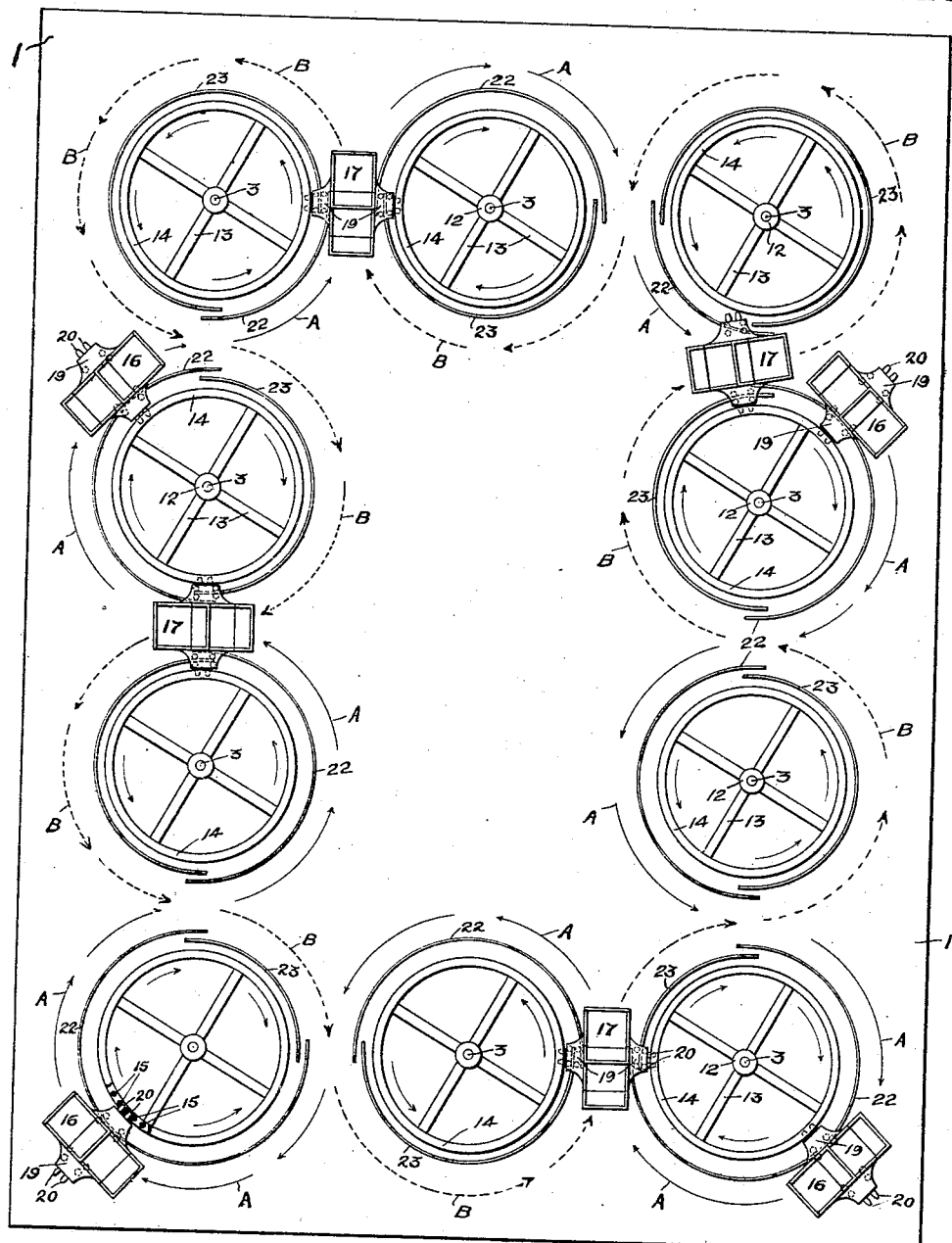
Figure 2:
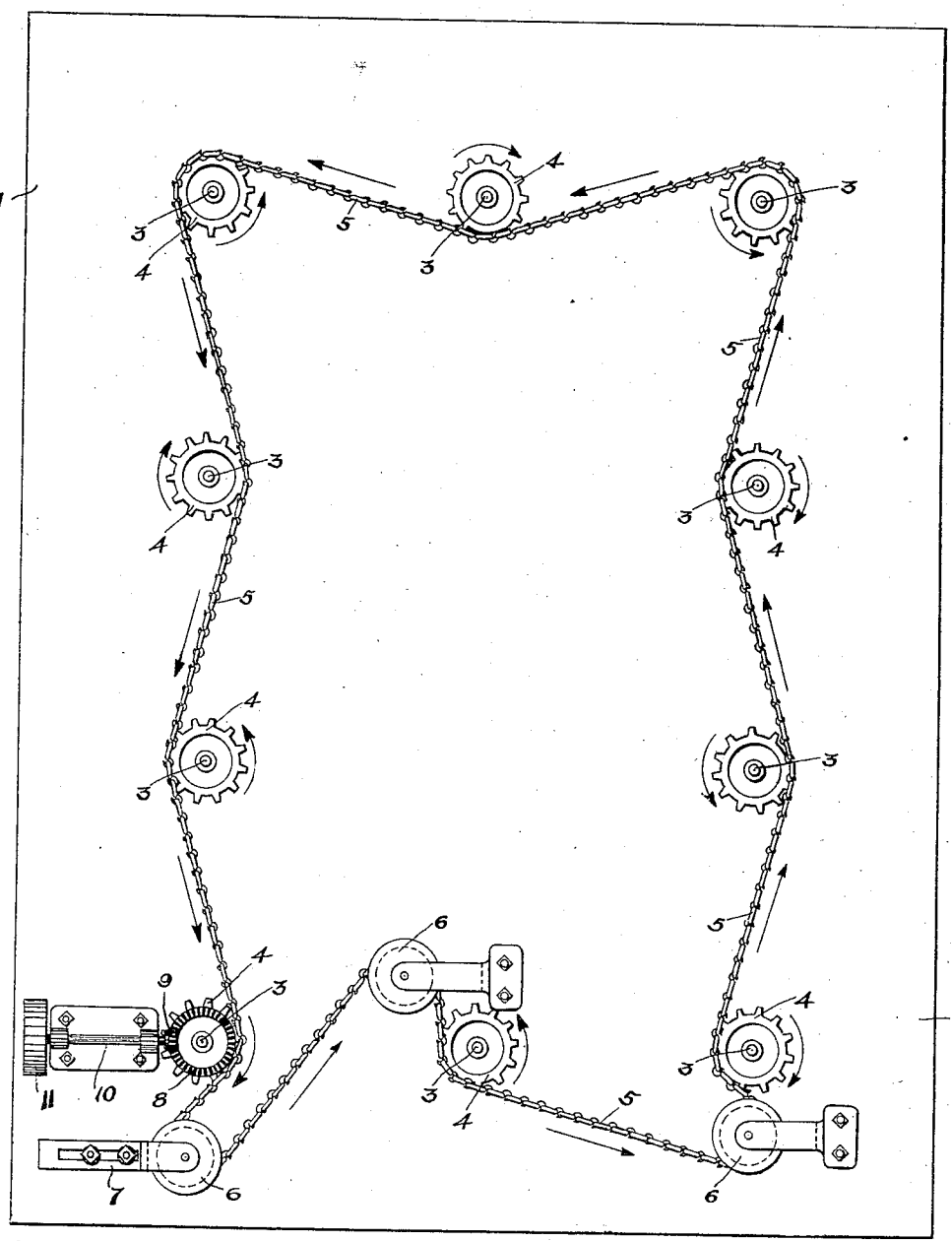

In the accompanying drawings Figure 1 is a plan view of a mechanism embodying my invention, Fig. 2 is a bottom plan of the same, Fig. 3 is a sectional elevation through one of the driving-wheels and a portion of two others, and Fig. 4 is a side elevation of one of the cars.

In the construction shown I provide a horizontal platform 1 which may be supported in any suitable manner so as to provide a space beneath the same for the driving chain, sprockets, etc. Passing vertically through the platform 1 and journaled in suitable bearings 2 secured thereto, are a plurality of shafts 3, spaced equidistantly from each other, and arranged as shown. On the lower ends of said shafts are secured the sprockets 4 over which an endless chain 5 is passed, idler pulleys 6 being arranged as shown in Fig. 2 where necessary to secure a suitable arc of contact between the chain and sprockets. One of the idler pulleys is carried by an adjustable bracket 7 by which the chain may be tightened when the same lengthens from wear. On one of the shafts 3 below the sprocket 4 is a bevel gear 8 which is engaged by a bevel pinion 9 carried on the shaft 10. The shaft 10 is driven from any source of power by suitable connections, such as a belt to the pulley 11, and, the same actuating the chain 5, all of the shafts 3 are driven therefrom.

On the upper ends of the shafts 3 are carried the driving-wheels comprising the hubs 12, arms 13 and rims consisting of the annular plates 14 between which are held the pins 15, as indicated in Fig. 3 and at the broken portion of the lower left-hand wheel shown in Fig. 1. The plates 14 and the pins 15 make the rims of the driving-wheels similar to that of a shrouded gear.

The car bodies 16 and 17 are supported on caster-wheels 18, as shown in Figs. 3 and 4, adapting the same to move around the intersecting alternating curvilinear paths indicated by the arrows A and B of Fig. 1, the cars 16 following the path indicated by the arrows A, and the cars 17 following the path indicated by the arrows B. The two sets of cars are actuated from the driving-wheels by the following means: On each side of the car bodies, in alinement with the rims of the driving wheels, are projecting members 19, at the edges of which are gear-like teeth 20 adapted to enter the spaces between the pins 15 of the wheel-rims, and be engaged thereby. The guide-rail sections 22 and 23 are secured to and project upwardly from the platform 1, said rails being in the form of circular arcs disposed concentrically with the driving-wheels. The radius of curvature of the rails 22 is slightly greater than that of the rails 23, and the height of the inner rails 23 above the platform is greater than that of the outer rails 22. The sections of the guide-rails are disposed alternately on opposite sides of the driving wheels, the rails 22 corresponding with the arrows A and the rails 23 corresponding with the arrows B. On the under sides of the projecting members 19 of the cars 16 are guide-rollers 24 adapted to engage the guide-rails 22; while on the projecting members 19 of the cars 17 are similar guide-rollers 25 adapted to engage the guide-rails 23, the arrangement of the rollers being such that when the same engage the respective guide-rails the teeth 20 are in position to be engaged by the pins 15 of the driving-wheels and the cars actuated thereby. The spacing of the driving-wheel shafts 3 is such that the distance between the adjacent rims of any two adjoining wheels is the same as the width of the cars between the edges of the projecting members 19, so that when one of the cars passes between two of the driving-wheels the teeth 20 on said projecting members are momentarily engaged by both of the wheels. The ends of the guide-rail sections 22 and 23 are so arranged that, as the teeth 20 on one side of the car engage the rim of the driving-wheel which the car is approaching, the guide-rollers at the same time engage the end of the respective guide-rail section around said wheel. Immediately thereafter the guide-rollers and the teeth 20 at the other side of the car disengage from the guide-rail and rim of the other driving wheel, so that each time a car passes between two of the driving-wheels it is transferred from one of the wheels to the other, and the direction of curvature of the path followed by the car is reversed. The inner guide-rail 23 being higher than the outer rail 22, the guide-rollers 25 engaging the same are enabled to pass over the top of the outer rail at the points of intersection of the paths of movement of the cars, while the rollers 24, being at all times outside of the rail-sections 23, the said rollers and rail-sections do not interfere with each other.

The movements of the cars will be clearly understood by reference to Fig. 1, wherein the cars are shown in various positions, the guide-rollers 24 and 25 being indicated by dotted lines engaging the respective guide-rails. It will be apparent that, owing to the gear-like driving mechanism employed, the cars are positively actuated and each car maintains at all times the same position relative to the other cars of the same set, so that the two sets of cars may, without danger, be so arranged that in crossing the intersections of paths between the driving-wheels the cars of one set will just avoid collision with the cars of the other set. This is illustrated by the two cars near the upper right-hand corner of Fig. 1, where the car 16 has just passed the intersection and the car 17 is just entering between the driving wheels, the guide-rollers thereof being about to engage the guide-rail section 23 of the corner driving-wheel.

The driving-wheels, instead of being arranged around an oblong rectangular space, as shown, may be arranged around a square, oval, circular, or elliptical space, or any combination thereof by which the cars may move in endless paths and pass successively around a portion of each of the driving-wheels.

Now, having described my invention, what I claim and desire to secure by Letters Patent is:

1. In a pleasure-railway, a plurality of driving-wheels, means for synchronously actuating the same, wheeled cars, means carried by said cars for engagement with the driving-wheels, and means for guiding the cars whereby the same will be actuated successively by each of the driving wheels and move in endless alternating curvilinear paths.

2. In a pleasure-railway, driving-wheels revoluble in a horizontal plane and equidistantly spaced around an area inclosed thereby, means for actuating said driving-wheels, wheeled cars, means carried by said cars for engagement with the driving-wheels, and means for guiding the cars whereby the same will be actuated successively by each of the driving-wheels and move around a portion of the peripheries of each of the same.

3. In a pleasure-railway, two sets of wheeled cars, an endless series of driving-wheels disposed in a substantially horizontal plane, means carried by the cars for engagement with the driving-wheels, and means for guiding each set of the cars whereby the same will be actuated successively by each of the driving-wheels and move in intersecting endless alternating curvilinear paths.

4. In a pleasure-railway, a substantially horizontal platform, an endless series of driving wheels disposed parallel with said platform, two sets of guide-rail sections, the sections of one set being of greater height and of smaller radius of curvature than the sections of the other set, one section of each set of guide-rails being placed around a portion of each of the driving-wheels, two sets of wheeled cars resting on said horizontal platform, the cars of one set having means for engaging one of the sets of guide-rail sections, the other set of cars having means for engaging the other set of guide-rail sections, and means for connecting the cars and driving-wheels whereby the cars will be driven around endless paths adjoining the guide-rails engaged thereby.

5. In a pleasure-railway, a substantially horizontal platform, an endless series of driving-wheels arranged above said platform and parallel therewith, cars supported by caster-wheels and movable on said horizontal platform, teeth at each side of the cars adapted for engagement with corresponding means on the rims of the driving-wheels, guide-rail sections disposed adjacent the rims of the driving wheels, and rollers carried at the sides of the cars adjacent the teeth thereon and adapted for engagement with said guide-rail sections, the arrangement being such that as any car passes between any adjoining pair of the driving wheels the rollers engaging the guide-rail section around one of the wheels will disengage therefrom and the rollers at the other side of the car will engage the corresponding guide-rail section around the other driving wheel, so that the car will be transferred from one of the driving-wheels to the other.

In testimony whereof I have hereunto subscribed my name in the presence of two witnesses.

BURTON A. KARR.

Witnesses:
D. O. BARNELL,
ROY G. KRATZ.